Dec. 1, 1931.   J. P. GERMAN   1,834,487
ANTISKID CHAIN
Filed Jan. 2, 1929

INVENTOR
John P. German
BY
H. G. Manning
ATTORNEY

Patented Dec. 1, 1931

1,834,487

UNITED STATES PATENT OFFICE

JOHN P. GERMAN, OF ELMWOOD, CONNECTICUT

ANTISKID CHAIN

Application filed January 2, 1929. Serial No. 329,852.

This invention relates to anti-skid devices, and more particularly to a non-skid transverse chain for an automobile tire.

One object of this invention is to provide a non-skid chain of the above nature having a plurality of cross-shaped tread members adapted to afford both longitudinal and transverse resistance to skidding.

A further object is to provide a device of the above nature in which the tread links are constructed of relatively thick wear-proof metal and are so shaped that they will always present sharp edges to the road surface irrespective of the amount of wear which they may receive.

A further object is to provide a device of the above nature which will be simple in construction, inexpensive to manufacture, easy to install and manipulate, compact, ornamental in appearance, and very efficient and durable in use.

With these and other objects in view there has been illustrated on the accompanying drawings one form in which the invention may be conveniently embodied in practice.

Figure 1:
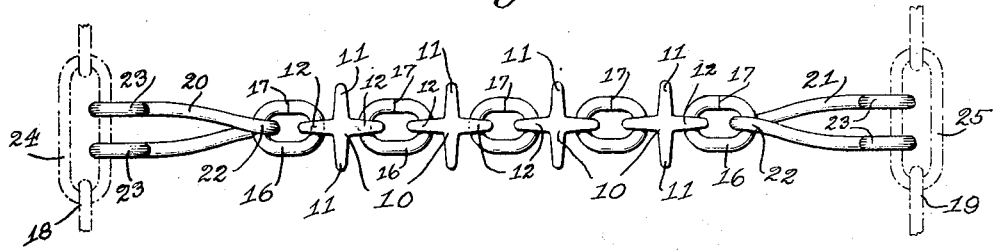
Fig. 1 represents a top plan view of a transverse tire chain embodying the present invention.
Figure 2:
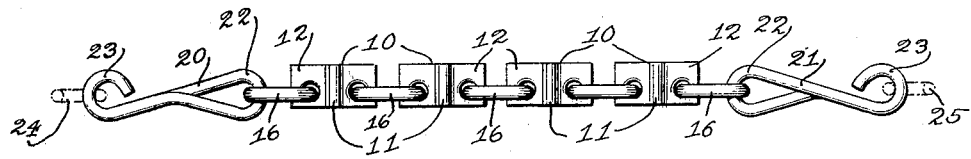
Fig. 2 is a side view of the same.
Figure 3:
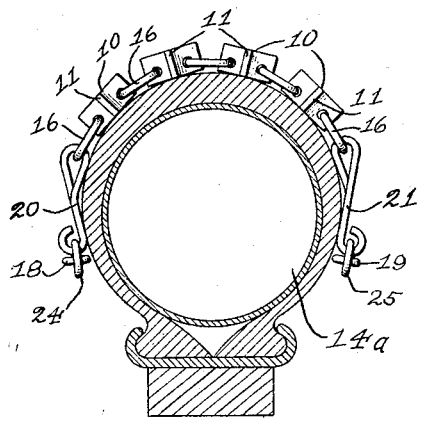
Fig. 3 is a transverse sectional view taken through a tire and showing the invention applied thereto.

Referring now to the drawings in which like reference numerals denote corresponding parts throughout the several views, the present invention consists of a transverse chain including a plurality of tread members 10.

Figure 4:
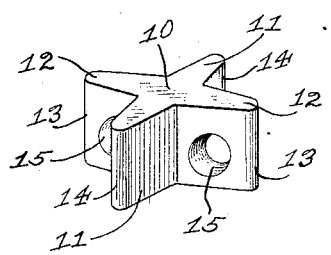
Fig. 4 is a perspective view of one of the metal tread members.

Each tread member 10 comprises a vertical cross-shaped prism cut from an elongated bar of steel, said prism then being carburized and hardened, and having four radially disposed equally-spaced tapered arms 11 and 12, said arms being rounded at their extremities 13 and 14 respectively, as most clearly shown in Fig. 4. The tread members 10 are adapted to lie with their bases tangent to the tread surface of a tire 14a, so that in use the outer faces of said tread members will be worn down uniformly by the road surface or pavement and will remain flat and with sharp edges.

Each of the transverse arms 12 of the tread members 10 is provided at a point near the base of said member with a cylindrical horizontal aperture 15 for receiving a small loop link 16 formed by bending a rod of soft iron or other malleable metal into the form of an oval having its extremities abutting at the points 17 on one side of said link 16, no welding being necessary.

It will be understood that the loops 16 serve to hold the tread members 10 in proper position but do not themselves receive any substantial wear from the pavement or roadway.

In order to connect the cross chain with a pair of side chains 18 and 19 disposed alongside the tire 14a below the center thereof, provision is made of a pair of side connecting links 20 and 21. Each of the links 20 and 21 has a vertical inner section 22 for engagement with one of the end loop links 16, and has a pair of outer vertical inwardly coiled eyes 23 adapted to be hooked through a pair of oppositely disposed horizontal links 24 and 25 of the side chains 18 and 19.

It will be seen that the extremities of the eyes 23 are spaced from the adjacent shanks of the connector links 20 and 21 sufficiently to permit the links 24 and 25 to be readily inserted through the openings therebetween, and said extremities may then be forced down against said shanks to close said eyes 23.

In operation, when it is desired to assemble the chain, the cross-shaped tread members 10 will first be connected alternately with the rod links 16 in the manner shown in the drawings. The side connector links 20 and 21 will then be connected to the end loop links 16, as shown, after which the outer eyes 23 thereof will be hooked through the horizontal links 24 and 25 of the side chains 18 and 19.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an anti-skid cross chain, a plurality of cross-shaped tread members having both transverse and longitudinal arms to provide resistance to skidding in all directions, the cross section of each tread member being uniform throughout its height, said transverse arms having apertures adjacent the tire-engaging faces thereof, each adjacent pair of tread members being connected by a link which passes through the apertures in the transverse arms of said tread members, said connecting links being located out of contact with the tire tread so as not to interfere with the gripping action of the inner surfaces of the tread members upon the tire tread, said tread members having smooth outer surfaces with perpetually sharp edges, said arms being sufficiently narrow that the outer edges thereof will grip icy surfaces and prevent skidding on the roadway, and the inner edges thereof will grip the tire surface and prevent lateral slipping of said tread members on said tire.

2. In an anti-skid cross-chain, a plurality of tread members, each having both transverse and longitudinal arms to provide resistance to skidding in all directions, each adjacent pair of tread members being connected by a link at points spaced from the bases of said tread members to maintain said link out of contact with the tire tread so as not to interfere with the tire-gripping action of the inner surfaces of the tread members, said tread members having smooth outer surfaces with perpetually sharp edges, said arms being sufficiently narrow that the outer edges thereof will grip the roadway surface and prevent skidding, and the inner edges thereof will grip the tire surface and prevent slipping of said tread members on said tire.

In testimony whereof, I have affixed my signature to this specification.

JOHN P. GERMAN.